United States Patent
Feng et al.

(10) Patent No.: US 6,883,648 B2
(45) Date of Patent: Apr. 26, 2005

(54) MECHANICAL DISK BRAKE FOR A BICYCLE

(75) Inventors: Chang-Hua Feng, Chiai (TW); Te-Sheng Tseng, Changhua (TW); Su-Hsien Liao, Chiai (TW)

(73) Assignee: National Science Council, Taipei (TW)

( * ) Notice: Subject to any disclaimer, the term of this patent is extended or adjusted under 35 U.S.C. 154(b) by 0 days.

(21) Appl. No.: 10/233,413

(22) Filed: Sep. 4, 2002

(65) Prior Publication Data

US 2004/0040793 A1 Mar. 4, 2004

(51) Int. Cl.⁷ ............................. B62L 5/00; F16C 1/16
(52) U.S. Cl. ................................. 188/26; 188/2 D
(58) Field of Search ..................... 188/2 D, 26, 24.22, 188/73.31

(56) References Cited

U.S. PATENT DOCUMENTS

| | | | | |
|---|---|---|---|---|
| 3,878,921 A | * | 4/1975 | Kibler et al. ................. | 188/26 |
| 3,927,736 A | * | 12/1975 | Bergles ........................ | 188/26 |
| 5,979,609 A | * | 11/1999 | Tsai ............................. | 188/26 |
| D419,934 S | * | 2/2000 | DiBella ..................... | D12/180 |
| 6,557,671 B1 | * | 5/2003 | Kirimoto et al. ............. | 188/26 |
| 6,564,910 B1 | * | 5/2003 | Chen et al. ................... | 188/26 |

* cited by examiner

Primary Examiner—Xuan Lan T. Nguyen
(74) Attorney, Agent, or Firm—Birch, Stewart, Kolasch & Birch, LLP

(57) ABSTRACT

A mechanical disk brake for a bicycle is characterized in a thrust bearing included in a cam mechanism thereof to overcome the problem of a locked disk brake due to an overly large friction as frequently occurs in conventional mechanical disk brakes, and an eccentric force-application arm with an improved geometrical shape to create different arms of force that enables production of an enhanced tail braking force for the mechanical disk brake. The problem of largely reduced braking force occurs in conventional rim brakes in bad weather or in braking over a prolonged time, and the problem of self-locking frequently occurs in the conventional mechanical disk brakes.

23 Claims, 8 Drawing Sheets

MECHANICAL DISK BRAKE FOR A BICYCLE

BACKGROUND OF THE INVENTION

The present invention relates to a mechanical disk brake for a bicycle, and more particularly to a mechanical disk brake for a bicycle that overcomes the problem of a locked disk brake due to an overly large friction between components thereof.

A bicycle has developed from a conventional traffic means into a means useful in many specific fields. There are more and more people using bicycles in a variety of occasions. Functional requirements for a bicycle are much more strict than ever before, particularly a good brake system that involves the safety of riding the bicycle has drawn people's high attention to it. Among different types of braking mechanisms for bicycles, there is a rim brake that is also referred to as a V-type brake. The rim brake gradually fails to satisfy the current requirements for safety in riding a bicycle, particularly a cross-country or a mountain-climbing bicycle. For a bicycle to maintain an absolutely safe braking performance and a highly sensitive mobility under very bad weather and riding environments, it is necessary to develop a new braking mechanism for a bicycle to satisfy the strict requirements. A mechanical disk brake has gradually drawn people's attention because it has been tested and proven to be safer and more comfortable for use than the V-type brake.

U.S. Pat. No. 3,878,921 discloses a brake system for a bicycle, and U.S. Pat. No. 3,927,736 discloses a disk brake for a bicycle, both of which have considerably simple structures that enable easy production and assembly thereof. However, these types of brake systems for a bicycle all are subjected to a locked brake due to an overly high friction among components thereof and are therefore very danger to bicycle riders. Another problem with the conventional mechanical disk brake for a bicycle is a weak tail braking force that could not be effectively enhanced up to date. Therefore, it is desirable to develop an improved mechanical disk brake for a bicycle to overcome the locked brake and the insufficient tail braking force.

U.S. Pat. No. 5,979,609 also discloses a disk brake for a bicycle, in which a brake disk thereof is subjected to force at both sides to enable an enhanced braking effect. However, the brake disk subjected to force at both sides tends to produce thermal strain when the disk is in a braked state over a prolonged time. To avoid this problem, the brake disk must be made of a material having good radiating capacity. In addition, this type of disk brake has complicate structure and heavy weight to increase time and labor costs for manufacturing and assembling it.

U.S. Pat. No. D419934 discloses a disk brake for a bicycle. The disk brake has the advantages of simple structure, easy to assemble, convenient to adjust and replace the brake disk, and smoothly developed braking force. However, this type of disk brake has a poorly designed force-application arm that results in uncontrollable braking force, and a return spring with insufficient elasticity that results in delayed return of brake linings. That is, this type of disk brake is less sensitive.

In addition, the steel cord employed in general mechanical disk brake, as being affected by a tension thereof, fails to enable the conventional mechanical disk brake to effectively provide an enhanced tail braking force.

It is therefore tried by the inventor to develop a new mechanical disk brake for a bicycle to eliminate the above-mentioned disadvantages.

SUMMARY OF THE INVENTION

A primary object of the present invention is to provide a mechanical disk brake for a bicycle. The disk brake mainly includes a main fixing case adapted to mount on a front fork of the bicycle and serving as a base for different parts and components of the disk brake to securely mount thereon; a secondary fixing case to which two brake linings and a wear compensation means are mounted; a rotor-driving shaft for driving two rotors to rotate; an eccentric force-application arm having different center distances and providing a locating hole for holding a head of a steel cord in place, so as to convert a pull force of the steel cord into a torque that is transferred to the rotor-driving shaft; a steel cord locating pin for guiding and locating the steel cord to a working position; a round-head hexagonal screw for fixing the head of the steel cord to the eccentric force-application arm; a hexagonal socket-headed screw for connecting the eccentric force-application arm to the rotor-driving shaft; two sets of hexagonal socket-headed bolts and nuts for connecting the main fixing case to the secondary fixing case; a return spring for returning the eccentric force-application arm to an initial position; a thrust bearing for reducing frictional force to avoid a locked disk brake; two brake linings for producing a frictional resistance to stop a brake disk disposed between them from rotating; a leaf spring for returning the two brake linings to their initial positions; a spring locating pin for locating the leaf spring in place; a camshaft having two symmetrical slant surfaces provided at one side thereof for pushing the brake linings to tightly clamp the brake disk disposed between them to achieve the brake effect; two rotors for pushing the camshaft toward the brake linings; and a wear compensation means for adjusting the position of the brake linings when the same are partially worn off.

The mechanical disk brake for a bicycle of the present invention has simple structure and is easy to assemble. It includes a thrust bearing to reduce the frictional resistance among internal parts and components and thereby to avoid a self-locked brake, and an eccentric force-application arm having different center distances and a lengthened tail portion to overcome the problem of an insufficient tail braking force due to a tension of the steel cord, so that the disk brake always performs well under different riding environments. The mechanical disk brake of the present invention also uses a rotor-driving shaft to rotate rotors, so that the rotors are more accurately located to enable good control of braking force to be produced.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 8:
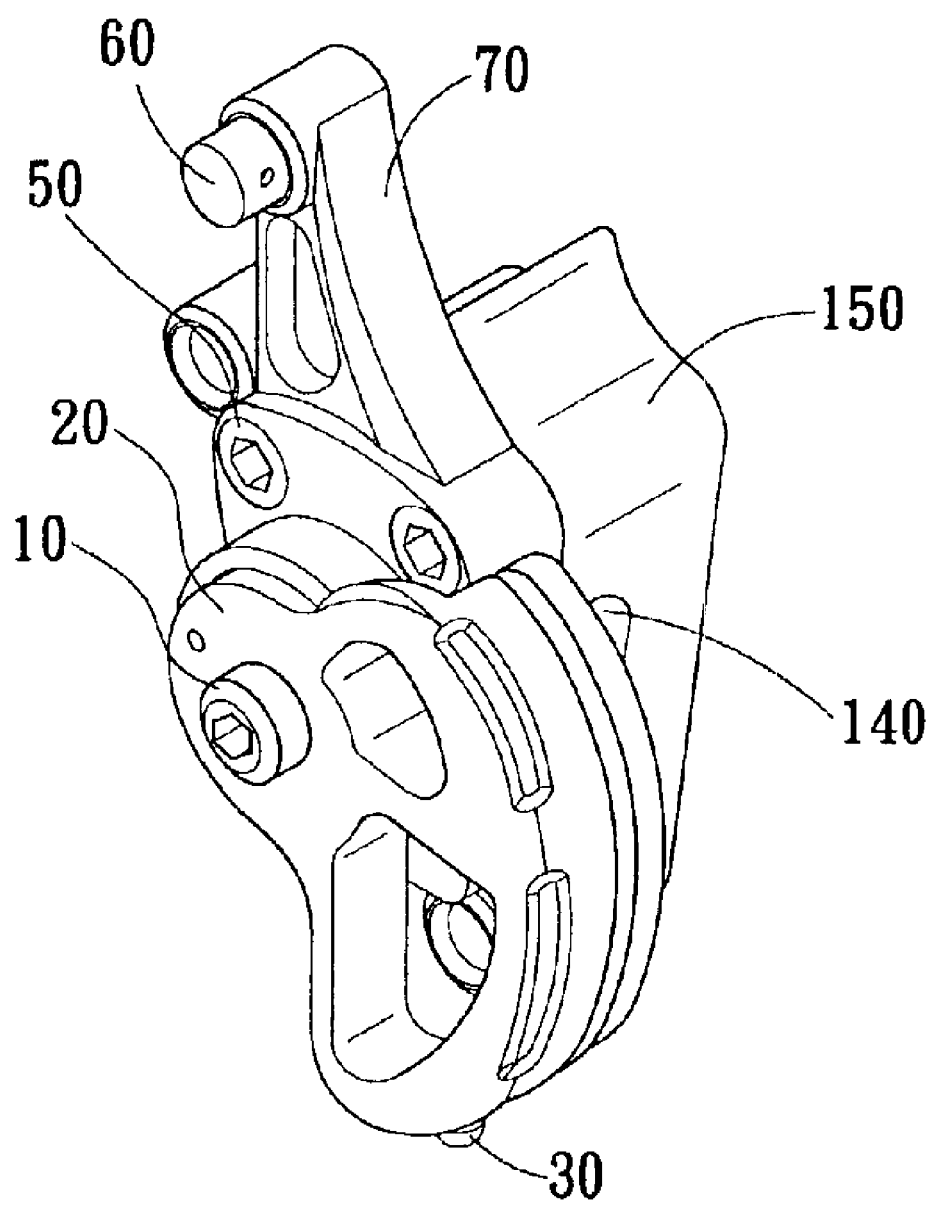
FIG. 8 is an assembled perspective view of the present invention.

Please refer to FIGS. 1 and 8 that are exploded and assembled perspective views, respectively, of a mechanical disk brake for a bicycle according to the present invention, which will be hereinafter referred to as the disk brake. As shown, the disk brake of the present invention mainly includes a torque output assembly A, a cam mechanism B, a return mechanism C, and a wear-compensation means 160.

Figure 1:
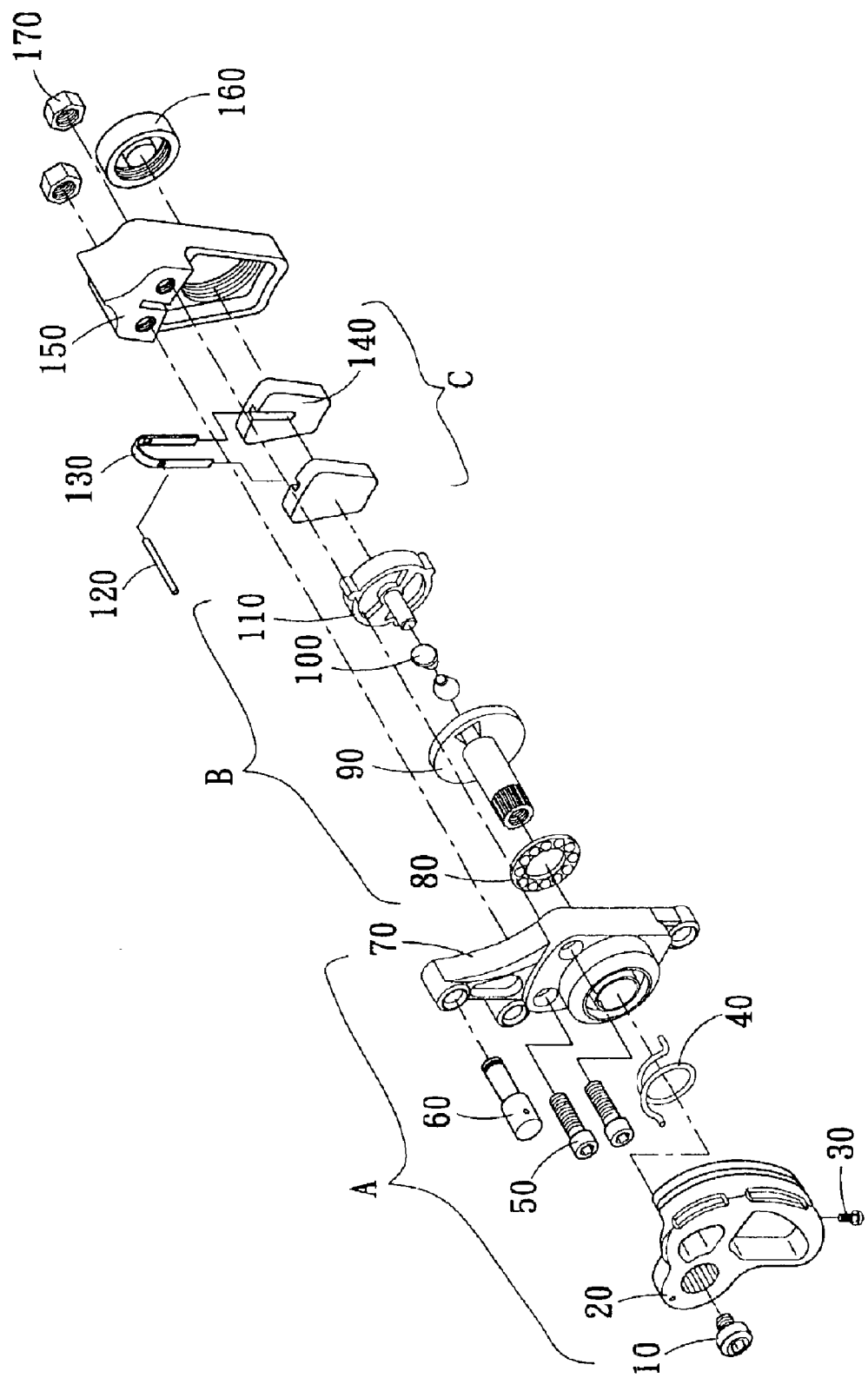
FIG. 1 is an exploded perspective view of a mechanical disk brake for a bicycle according to the present invention.
Figure 4:
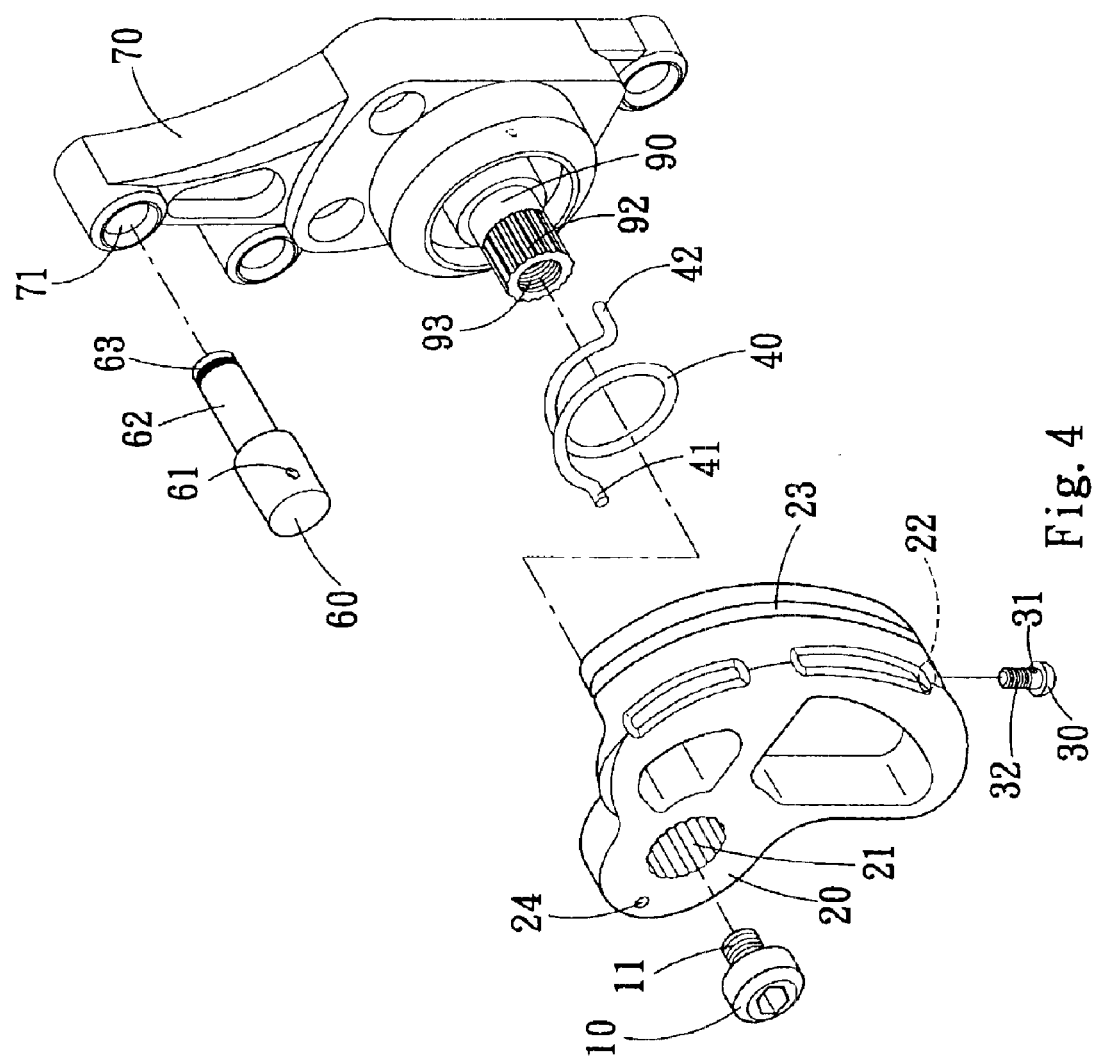
FIG. 4 is an exploded perspective view of a torque output assembly included in the present invention showing the assembling thereof.

Please refer to FIGS. 1 and 4 at the same time. The torque output assembly A mainly includes a main fixing case 70, a steel cord guiding and locating pin 60, two hexagonal socket-headed bolts 50, a return spring 40, an eccentric force-application arm 20, and a hexagonal socket-headed screw 10.

The main fixing case 70 is provided with a plurality of locating recesses in different geometrical shapes and a plurality of locating shaft holes 71 in different inner diameters for holding different parts and components of the disk brake to appropriate positions. The main fixing case 70 may have a configuration selected from any one of many functionally similar geometrical shapes.

The steel cord guiding and locating pin 60 is provided near an end with a hole 61, through which a steel cord (not shown) is extended to maintain in a fixed position, and near another end with an annular groove 63 for receiving a suitable type of retaining ring therein.

The eccentric force-application arm 20 is an eccentric member having different center distances. Since the eccentric force-application arm 20 has a tail portion that has an extended radius, it provides a lengthened arm of force to enhance a tail brake force. The eccentric force-application arm 20 may be of any proper geometrical shape with a curved steel cord guide groove 23 provided along an outer peripheral surface thereof for receiving the steel cord and preventing the latter from moving out of the eccentric force-application arm 20. The eccentric force-application arm 20 is also provided with an internally threaded steel cord head locating hole 22 for holding a head of the steel cord in place. The eccentric force-application arm 20 is also provided at a predetermined position with a fixing hole 21, into which a rotor-driving shaft 90 included in the cam mechanism B is extended. The fixing hole 21 may be a hole internally provided with a plurality of axially parallel teeth or be a regular polygonal hole.

The return spring 40 may be a torsional spring, a compression spring or a tension spring.

Figure 2:
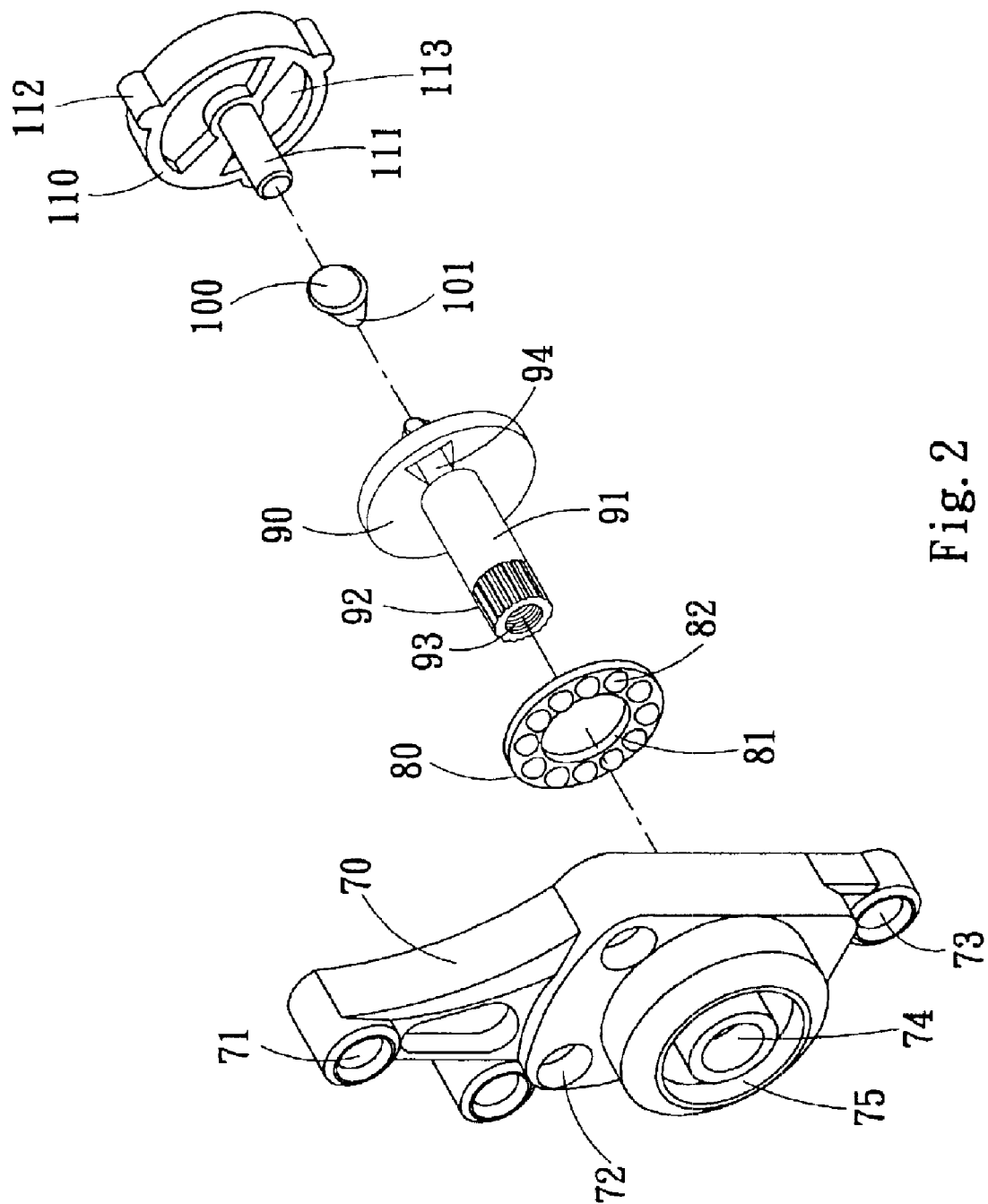
FIG. 2 is an exploded perspective view of a cam mechanism included in the present invention viewed from an end thereof to show the assembling thereof.
Figure 3:
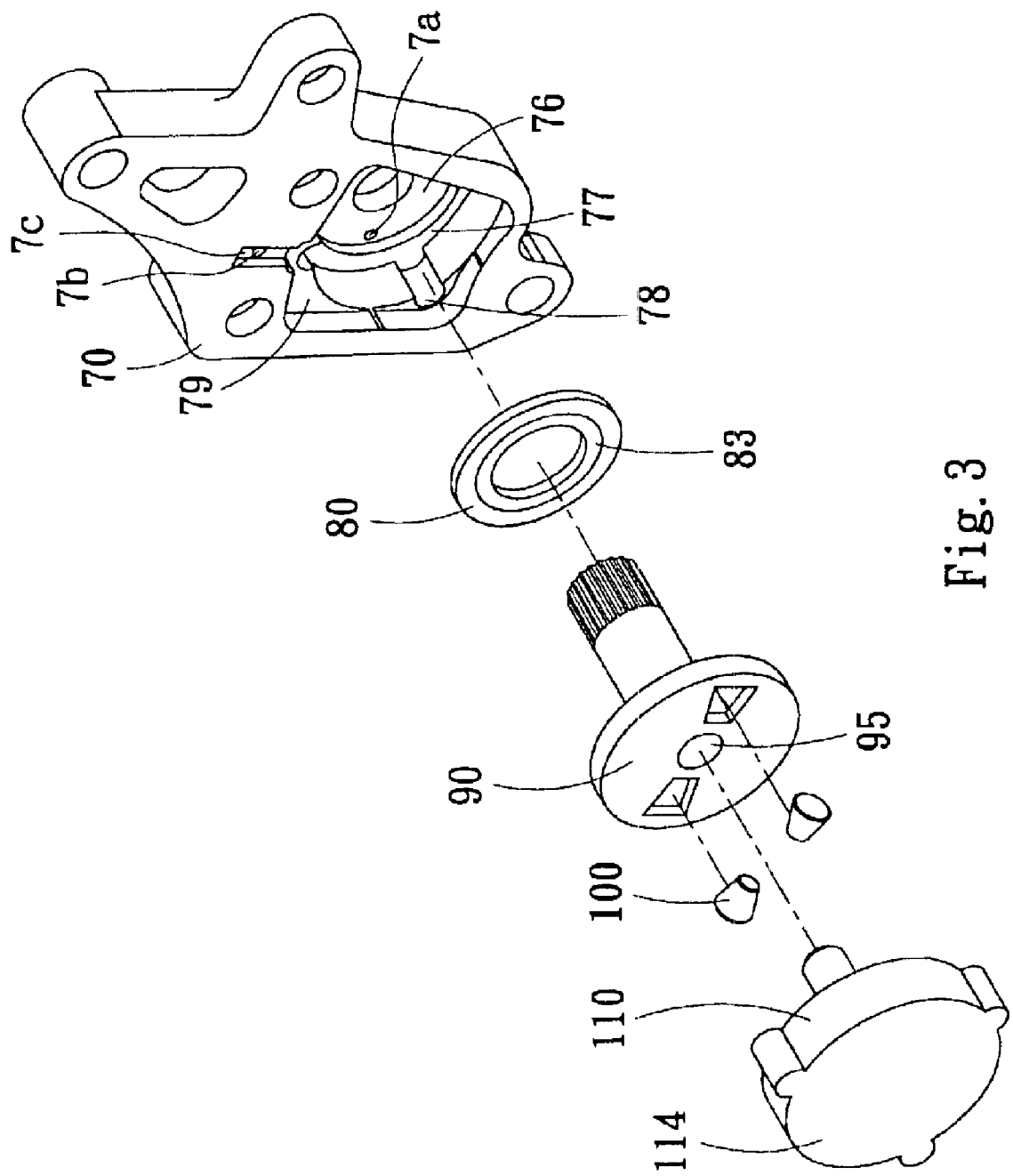
FIG. 3 is an exploded perspective view of the cam mechanism of FIG. 2 viewed from another end thereof.

Please refer to FIGS. 2 and 3. The cam mechanism B mainly includes a thrust bearing 80, a rotor-driving shaft 90, two rotors 100, and a camshaft 110.

The thrust bearing 80 is a standard part and may include spherical, cylindrical or truncated-conical balls 82 to prevent the two rotors 100 from locking to a slant surface 113.

The rotor-driving shaft 90 is a hollow shaft being provided at an end with an internally threaded screw receiving hole 93, into which the hexagonal socket-headed screw 10 included in the torque output assembly A is screwed to connect the eccentric force-application arm 20 to the rotor-driving shaft 90, and at another end with a non-threaded locating hole 95 for receiving a locating shaft 111 of the camshaft 110. The rotor-driving shaft 90 is provided with two diametrically symmetrical rotor-locating openings 94, a cross sectional shape of which corresponds to a configuration of the rotors 100 and may be round, square, or other geometrical shape. The rotor-driving shaft 90 is adapted to convert a torque of the eccentric force-application arm 20 into a rotary force to rotate the rotors 100. The rotor-driving shaft 90 is a flanged shaft for mounting in a driving shaft locating seat 76 provided at one side of the main fixing case 70 opposite to the eccentric force application arm 20. The screw receiving hole 93 is provided along an outer peripheral surface with a plurality of locating keys 92 that may be axially parallel teeth or planes of a regular polygon corresponding to the teeth or regular polygon in the fixing hole 21 on the eccentric force-application arm 20 to firmly locate in the fixing hole 21.

The two rotors 100 are used to push the camshaft 110. The rotors 100 may have a configuration selected from many functionally similar geometrical shapes, such as spherical, truncated conic, cylindrical shapes, etc.

The camshaft 110 is used to push two brake linings 140 to tightly clamp a brake disk disposed between them and thereby produces a braking effect. The camshaft 110 is a flanged shaft with a plurality of locating keys 112 spaced along a circumference of a flange thereof to prevent the camshaft 110 from rotating and causing the disk brake to lose its braking function. The locating keys 112 may have a configuration selected from any one of many functionally similar geometrical shapes, such as semi-circular, square, triangular shapes, etc. The camshaft 110 also includes a locating shaft 111 for engaging with the locating hole 95 on the rotor-driving shaft 90. The slant surface 113 of the camshaft 110 is divided into two dual-slope slant surfaces 113. With the dual-slope slant surfaces 113, a gradually enhanced braking force may be produced. The dual-slope slant surfaces 113 have a cross sectional shape corresponding to the configuration of the rotors 100, and may be of semi-circular, U-shaped, etc.

Figure 5:
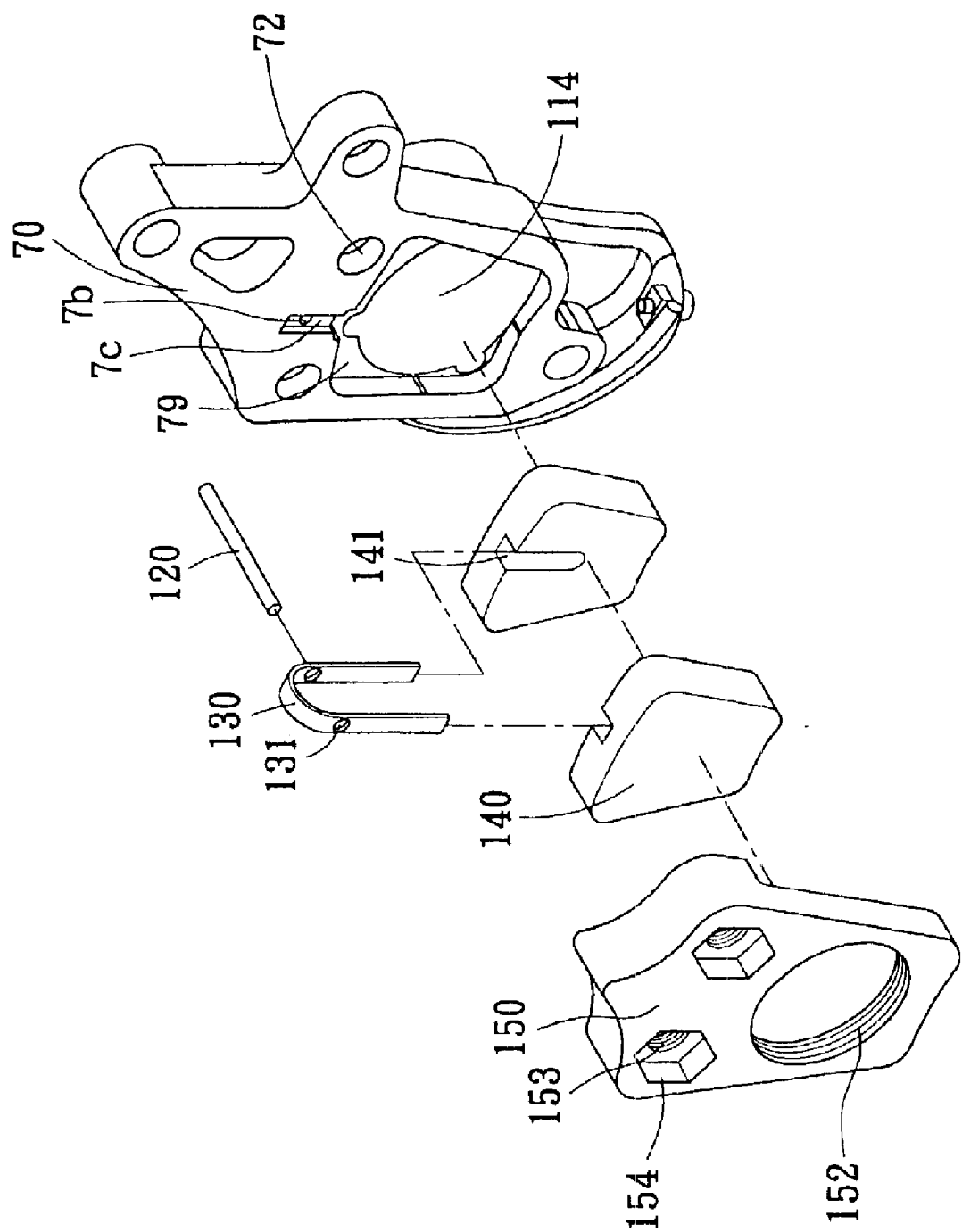
FIG. 5 is an exploded perspective view of a return mechanism included in the present invention viewed from an end thereof to show the assembling thereof.
Figure 6:
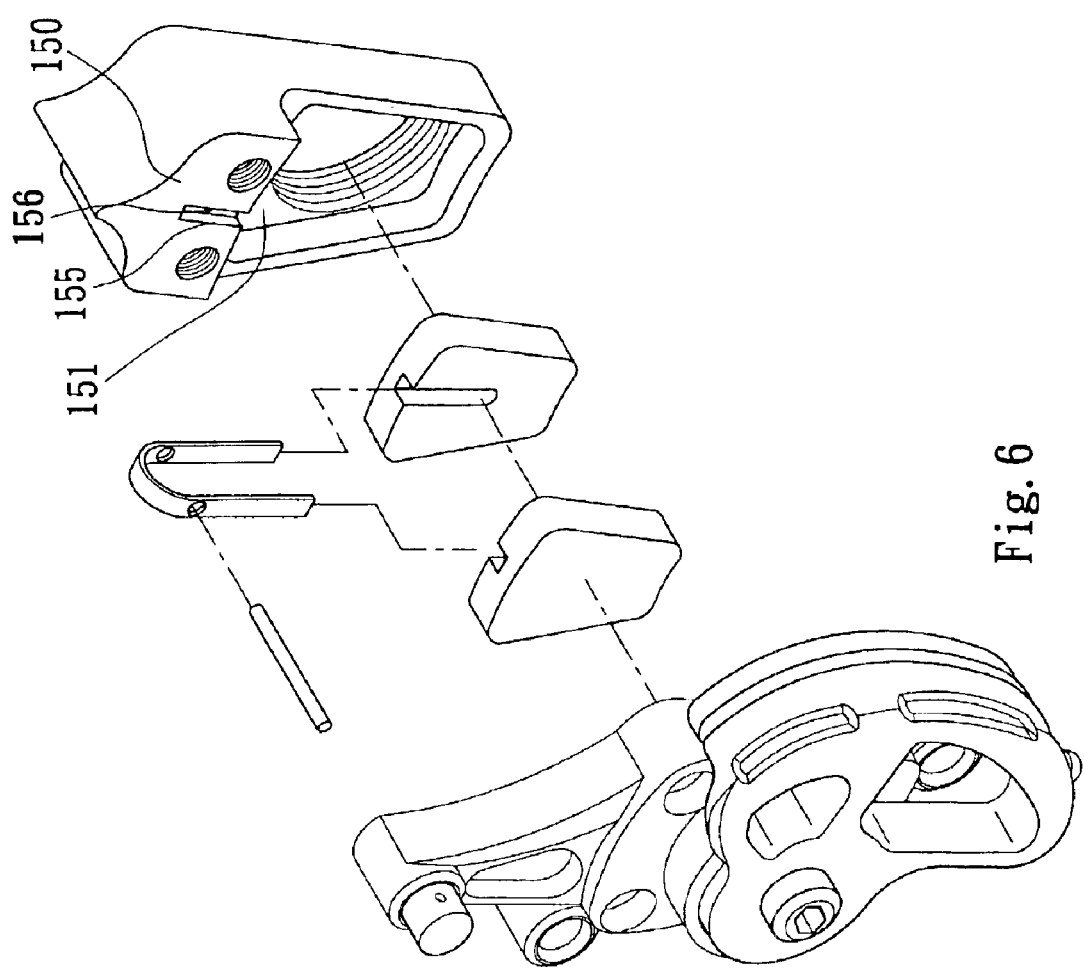
FIG. 6 is an exploded perspective view of the return mechanism of FIG. 5 viewed from another end thereof.

As FIGS. 5 and 6 shown, the return mechanism C mainly includes a spring locating pin 120, a leaf spring 130, and two brake linings 140.

The spring locating pin 120 is a round bar for locating the leaf spring 130 in place. The leaf spring 130 is used to return the brake linings 140 to their initial positions. The leaf spring 130 may be a U-shaped spring or in any other functionally similar geometrical shape to provide an appropriate rigidity. The braking linings 140 are made of a material having a high friction coefficient, and are separately provided with a spring locating recess 141, a configuration of which corresponds to that of the leaf spring 130.

Figure 7:
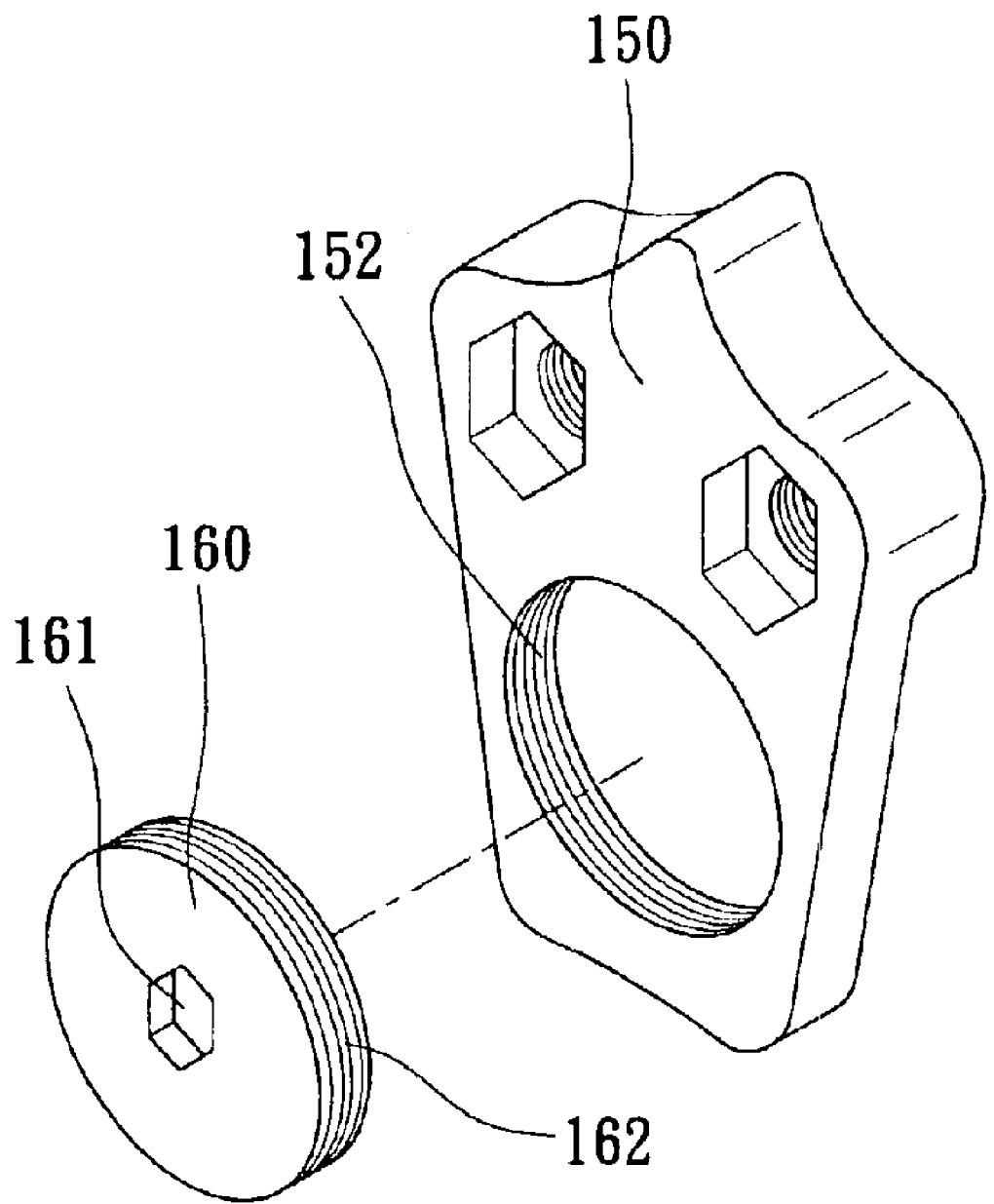
FIG. 7 is a perspective view of a wear-compensation means included in the present invention-showing the assembling thereof.

As FIG. 7 shown, the wear compensation means 160 is a circular flat member having external screw threads 162 and a centered hexagonal hole 161 to facilitate adjustment of a position of the wear compensation means 160.

Please refer to FIGS. 1, 2 and 3 at the same time. In a preferred manner of assembling the disk brake of the present invention, first position the thrust bearing 80 in the driving shaft locating seat 76 on the main fixing case 70, so that bearing balls 82 of the thrust bearing 80 and the driving shaft locating seat 76 are in rotary contact with each other to accordingly enable a reduced frictional resistance between them and avoid a locked disk brake. Then, extend a locating shaft 91 of the rotor-driving shaft 90 through a bearing hole 81 of the thrust bearing 80 and an axial locating hole 74 on the main fixing case 70, and position the two rotors 100 in the two rotor locating openings 94 on the rotor-driving shaft 90, so that a conic surface 101 of each rotor 100 is in rotary contact with a bearing face 83 of the thrust bearing 80 to enable a reduced frictional resistance between them and avoid a locked disk brake. Finally, extend the locating shaft 111 of the camshaft 110 into the locating hole 95 of the rotor-driving shaft 90 and cause the rotors 100 to fitly contact with the dual-slope slant surfaces 113 of the camshaft 110. Meanwhile, be sure to engage the locating keys 112 spaced along the circumference of the camshaft 110 with locating-key seats 78 provided in the main fixing case 70 to avoid a rotary motion of the camshaft 110 in a circumferential direction relative to the main fixing case 70.

When the rotor-driving shaft 90 is used to rotate the rotors 100, contacting of the rotating rotors 100 with the dual-slope slant surfaces 113 of the camshaft 110 causes an axial motion of the camshaft 110 to push the brake linings 140 to tightly clamp the brake disk (not shown) disposed between them and therefore achieve the braking effect.

After the cam mechanism B is assembled and connected to the main fixing case 70 in the above-described steps, the torque output assembly A is then assembled. First extend the steel cord guiding and locating pin 60 through an upper locating shaft hole 71 on the main fixing case 70, and use a C-shaped retaining ring to retain the locating pin 60 to the main fixing case 70. Then, insert a first axial insertion head 41 of the return spring 40 into a spring receiving hole 24 on the eccentric force-application arm 20, and insert a second axial insertion head 42 of the return spring 40 into a spring receiving hole 7a on the main fixing case 70. Meanwhile, engage the fixing hole 21 on the eccentric force-application arm 20 with the locating keys 92 on the rotor-driving shaft 90, and firmly screw an externally threaded stem 11 of the hexagonal socket-headed screw 10 into the internally threaded screw receiving hole 93 on the rotor-driving shaft 90.

To fix the steel cord (not shown), first extend the head of the steel cord through a steel cord hole 31 on a round-head socket screw 30 and the hole 61 on the steel cord guiding and locating pin 60. Then, extend the round-head socket screw 30 into the screw locating hole 22 on the eccentric force-application arm 20, and screw a hexagonal nut (not shown) onto an externally threaded stem 32 of the round-head socket screw 30 to lock the head of the steel cord to the eccentric force-application arm 20. Thereafter, fit the steel cord in the curved steel cord guide groove 23 on the eccentric force-application arm 20 to prevent the steel cord from separating therefrom, so that a torque produced by the torque output assembly A could be successfully transferred to the rotor-driving shaft 90. A tension of the steel cord would result in an insufficient tail braking force. With the eccentric force-application arm 20 that is a member having different center distances, different arms of force are created in an operation process of the eccentric force-application arm 20, and the lengthened tail arm of force thereof enables production of an increased tail braking force.

The return mechanism C is then assembled. Please refer to FIGS. 1, 5 and 6. First mount a first one of the two brake linings 140 into a brake lining seat 79 on the main fixing case 70, so that the brake lining 140 bears against an acting surface 114 of the camshaft 110. Then, insert a first end of the spring locating pin 120 into a locating pin hole 7b on the main fixing case 70, and connect the leaf spring 130 to the locating pin 120 by engaging the locating pin 120 with two locating holes 131 provided on the leaf spring 130. Be sure to have one lateral side of the leaf spring 130 set in a spring locating seat 7c on the main fixing case 70 and in the spring locating recess 141 on the first brake lining 140. The second brake lining 140 is then positioned in a brake lining seat 151 on a secondary fixing case 150. Then, set the other lateral side of the leaf spring 130 in a spring locating seat 155 on the secondary fixing case 150 and in the spring locating recess 141 on the second brake lining 140, and insert a second end of the spring locating pin 120 into a locating hole 156 in the spring locating seat 155. Thereafter, screw the two hexagonal socket-headed bolts 50 through two bolt holes 72 on the main fixing case 70 and two bolt holes 153 on the secondary fixing case 150 to engage with two hexagonal nuts 170 located in two nut seats 154 on the secondary fixing case 150. Finally, tighten the nuts 170 with a suitable hand tool, so that the main fixing case 70 and the secondary fixing case 150 are firmly screwed together. The leaf spring 130 is provided mainly to return the two brake linings 140 to their initial positions when a force applied on the disk brake is released.

The last part to be assembled is the wear compensation means 160. Please refer to FIGS. 1 and 7. Screw the externally threaded wear compensation means 160 into an internally threaded opening 152 on the secondary fixing case 150. When the brake linings 140 are worn out, to engage a tool with the hexagonal hole 161 on the wear compensation means 160 and thereby turns the latter toward the brake linings 140. With the external screw threads 162 provided on the circumferential surface of the wear compensation means 160, turning of the wear compensation means 160 causes the same to move forward in the internally threaded opening 152 on the secondary fixing case 150 to compensate a thickness of the brake linings 140 that has been worn off. In this manner, the disk brake of the present invention is maintained in a required braking sensitivity.

Now, the mechanical disk brake for a bicycle according to the present invention is fully assembled. FIG. 8 is an assembled perspective view of the present invention. With lugs having through holes 73 provided on the main fixing case 70, the disk brake of the present invention may be firmly screwed to a front fork of a bicycle (not shown). The disk brake of the present invention works with a brake disk and a braking handle to achieve the braking effect.

With the above arrangements, the present invention is particularly characterized by the following two facts:

1. The provision of the thrust bearing 80 solves the problem existing in conventional mechanical disk brakes for a bicycle that an overly-large friction of the disk brake results in a locked brake. The disk brake of the present invention is therefore safer for use as compared with the conventional ones.

2. The provision of the eccentric force-application arm with an improved structure (or shape) creates different arms of force to enhance the tail braking force of the mechanical disk brake. The problem of largely reduced braking force occurs in the conventional rim brakes in bad weather or in braking over a prolonged time, and the problem of self-locked brake frequently occurs in the conventional mechanical disk brakes are therefore effectively improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mechanical disk brake for reducing speed of a bicycle in moving, comprising:
    a torque output assembly including an eccentric force-application arm that works with a return spring and a steel cord guiding and locating pin to create different arms of force and convert a pull force of said steel cord into a torque, and a main fixing case to which said eccentric force-application arm and many other parts and components of said disk brake are mounted at predetermined positions, so that said disk brake could be mounted on a front fork of a bicycle;
    a cam mechanism including a thrust bearing, a rotor-driving shaft, two rotors, and a camshaft; said rotor-driving shaft being used to push said two rotors for the same to act on a slant surface of said camshaft, so that said camshaft moves in an axial motion like a piston, and said thrust bearing being adapted to avoid a locked disk brake;
    a return mechanism including a leaf spring set between two axially spaced brake linings, said leaf spring providing an elastic force for said two brake linings to return to their initial position from a braked position; and
    a wear compensation means including a bolt that could be turned and thereby moved toward said brake linings to compensate any portion of said brake linings that has been worn off;
    said mechanical disk brake for a bicycle being characterized in that said rotor-driving shaft is connected to said eccentric force-application arm with a screw, such that said eccentric force-application arm converts the pull force of said steel cord into a torque to rotate said rotor-driving shaft, causing said two rotors mounted on said rotor-driving shaft to rotatably contact with said slant surface of said camshaft and thereby bring said camshaft to move in axial motion like a piston, said camshaft in axial motion being adapted to push one of said two brake linings toward the other one and thereby tightly clamp a brake disk disposed between said two brake linings to create a braking effect; and that said rotors are precisely located in two rotor locating openings on said rotor-driving shaft to enable easily controllable application of force to actuate said disk brake;
    wherein said eccentric force-application arm is provided along a circumferential periphery with a steel cord guide groove for receiving said steel cord therein and preventing said steel cord from moving out of said eccentric force-application arm, and at a lower portion with a screw locating hole for firmly holding a head of said steel cord therein with a screw.

2. The mechanical disk brake for a bicycle as claimed in claim 1, wherein said eccentric force-application arm is an eccentric member having different center distances and a tail portion with an increased radius and accordingly a lengthened arm of force to enable an enhanced tail braking force, and wherein said eccentric force-application arm has a configuration that may be selected from any one of many functionally similar geometrical shapes.

3. The mechanical disk brake for a bicycle as claimed in claim 1, wherein said eccentric force-application arm is provided at a predetermined position with a fixing hole for receiving said rotor-driving shaft therein, and said fixing hole being either a hole internally provided with a plurality of axially parallel teeth or a regular polygonal hole.

4. The mechanical disk brake for a bicycle as claimed in claim 1, wherein said return spring is selected from the group consisting of torsional springs, compression springs and tension springs.

5. The mechanical disk brake for a bicycle as claimed in claim 1, wherein said steel cord guiding and locating pin is provided at a predetermined position near a first end with a hole through which said steel cord is extended and thereby held in place, and at a second end opposite to said first end with an annular groove for receiving a suitable type of retaining ring therein.

6. The mechanical disk brake for a bicycle as claimed in claim 1, wherein said main fixing case is provided at predetermined positions with a plurality of locating recesses in different geometrical shapes and a plurality of locating holes in different inner diameters for holding different parts and components of said disk brake to appropriate positions.

7. The mechanical disk brake for a bicycle as claimed in claim 1, wherein said return mechanism further includes a spring locating pin for holding said leaf spring in place in said disk brake, and wherein said two axially spaced brake linings are adapted to stop a brake disk disposed between them from rotating and said leaf spring serves to return said two brake linings to their initial position from a braked position.

8. The mechanical disk brake for a bicycle as claimed in claim 7, wherein said spring locating pin is a round bar.

9. The mechanical disk brake for a bicycle as claimed in claim 7, wherein said leaf spring is a U-shaped leaf.

10. The mechanical disk brake for a bicycle as claimed in claim 9, wherein said brake linings are made of a material having a high friction coefficient, and are separately provided at a predetermined position with a spring locating recess, and said spring locating recesses having a configuration corresponding to that of said leaf spring.

11. The mechanical disk brake for a bicycle as claimed in claim 1, wherein said bolt forming said wear compensation means is a round flat member having external screw threads provided along a circumferential surface thereof and a centered hexagonal hole to facilitate adjustment of a position of said wear compensation means relative to said brake linings.

12. The mechanical disk brake for a bicycle as claimed in claim 11, wherein said wear compensation means includes an anti-loosing means, which may be, for example, a ratchet mechanism.

13. The mechanical disk brake for a bicycle as claimed in claim 1, wherein said wear compensation means includes an anti-loosing means, which may be, for example, a ratchet mechanism.

14. A mechanical disk brake for reducing speed of a bicycle in moving, comprising:
    a torque output assembly including an eccentric force-application arm that works with a return spring and a steel cord guiding and locating pin to create different arms of force and convert a pull force of said steel cord into a torque, and a main fixing case to which said eccentric force-application arm and many other parts and components of said disk brake are mounted at predetermined positions, so that said disk brake could be mounted on a front fork of a bicycle;
    a cam mechanism including a thrust bearing, a rotor-driving shaft, two rotors, and a camshaft; said rotor-driving shaft being used to push said two rotors for the same to act on a slant surface of said camshaft, so that said camshaft moves in an axial motion like a piston, and said thrust bearing being adapted to avoid a locked disk brake;

a return mechanism including a leaf spring set between two axially spaced brake linings, said leaf spring providing an elastic force for said two brake linings to return to their initial position from a braked position; and a wear compensation means including a bolt that could be turned and thereby moved toward said brake linings to compensate any portion of said brake linings that has been worn off;

said mechanical disk brake for a bicycle being characterized in that said rotor-driving shaft is connected to said eccentric force-application arm with a screw, such that said eccentric force-application arm converts the pull force of said steel cord into a torque to rotate said rotor-driving shaft, causing said two rotors mounted on said rotor-driving shaft to rotatably contact with said slant surface of said camshaft and thereby bring said camshaft to move in axial motion like a piston, said camshaft in axial motion being adapted to push one of said two brake linings toward the other one and thereby tightly clamp a brake disk disposed between said two brake linings to create a braking effect; and that said rotors are precisely located in two rotor locating openings on said rotor-driving shaft to enable easily controllable application of force to actuate said disk brake;

wherein said thrust bearing of said cam mechanism is adapted to prevent said rotors and said slant surface on said camshaft from locking to each other; said rotor-driving shaft being adapted to convert a torque of said eccentric force-application arm into a force to rotate said rotors; said two rotors in rotating being adapted to push said camshaft to move in axial motion like a piston; and said camshaft pushed by said rotors being adapted to push said two brake linings to tightly clamp the brake disk disposed between them to achieve a braking effect;

wherein said rotor-driving shaft includes a hollow locating shaft having an internally threaded portion, said rotor-driving shaft being connected to said eccentric force-application arm by extending said hollow locating shaft into a fixing hole on said eccentric force-application arm and engaging said screw with said internally threaded portion of said hollow locating shaft; and said hollow locating having shaft non-threaded portion opposite to said internally threaded portion for receiving a locating shaft of said camshaft therein.

15. The mechanical disk brake for a bicycle as claimed in claim 14, wherein said thrust bearing is a standard part and may include or spherical, cylindrical or truncated-conical balls.

16. The mechanical disk brake for a bicycle as claimed in claim 14, wherein said rotor-driving shaft is a flanged shaft adapted to set in a driving shaft locating seat provided on said main fixing case, and includes a locating shaft having a plurality of locating keys provided along an outer surface of a front end thereof for setting in a fixing hole on said eccentric force-application arm, and said locating keys being either a plurality of axially parallel teeth or planes of a regular polygon.

17. The mechanical disk brake for a bicycle as claimed in claim 16, wherein said locating shaft of said rotor-driving shaft is a hollow shaft having an internally threaded portion, and said rotor-driving shaft being connected to said eccentric force-application arm by extending said hollow locating shaft into said fixing hole on said eccentric force-application arm and engaging said screw with said internally threaded portion of said hollow locating shaft; and said hollow locating shaft having a non-threaded portion opposite to said internally threaded portion for receiving a locating shaft of said camshaft therein.

18. The mechanical disk brake for a bicycle as claimed in claim 17, wherein said rotor-driving shaft is provided with two diametrically symmetrical rotor locating openings, a cross sectional shape of which corresponding to a configuration of said rotors and being either round or square in shape.

19. The mechanical disk brake for a bicycle as claimed in claim 14, wherein said rotor-driving shaft is provided with two diametrically symmetrical rotor locating openings, a cross sectional shape of which corresponding to a configuration of said rotors and being either round or square in shape.

20. The mechanical disk brake for a bicycle as claimed in claim 14, wherein said rotors have a configuration that may be selected from the group consisting of round balls, truncated cones, and cylinders.

21. The mechanical disk brake for a bicycle as claimed in claim 14, wherein said camshaft is a flanged shaft with a plurality of locating keys spaced along a circumference of a flange thereof to prevent said camshaft from rotating and causing said disk brake to lose its braking function; said locating keys having configuration selected from a group consisting of semi-circular, square, and triangular shapes; and said camshaft also including a locating shaft for engaging with a locating hole on said rotor-driving shaft.

22. The mechanical disk brake for a bicycle as claimed in claim 21, wherein said slant surface on said camshaft is divided into two symmetrical dual-slope slant surfaces that enable production of a gradually enhanced braking force; and said dual-slope slant surfaces having a cross sectional shape corresponding to that of said rotors and being either semi-circular or U-shaped.

23. The mechanical disk brake for a bicycle as claimed in claim 14, wherein said slant surface on said camshaft is divided into two symmetrical dual-slope slant surfaces that enable production of a gradually enhanced braking force; and said dual-slope slant surfaces having a cross sectional shape corresponding to that of said rotors and being either semi-circular or U-shaped.

* * * * *